United States Patent
Yanaba et al.

(10) Patent No.: US 11,503,246 B2
(45) Date of Patent: Nov. 15, 2022

(54) VIDEO OUTPUT CONTROLLING APPARATUS AND VIDEO OUTPUT CONTROLLING METHOD

(71) Applicant: SONY INTERACTIVE ENTERTAINMENT INC., Tokyo (JP)

(72) Inventors: Koji Yanaba, Tokyo (JP); Kousuke Yoshimura, Tokyo (JP); Yuji Kawamura, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 16/631,554

(22) PCT Filed: Aug. 6, 2018

(86) PCT No.: PCT/JP2018/029391
§ 371 (c)(1),
(2) Date: Jan. 16, 2020

(87) PCT Pub. No.: WO2019/031445
PCT Pub. Date: Feb. 14, 2019

(65) Prior Publication Data
US 2020/0213556 A1 Jul. 2, 2020

(30) Foreign Application Priority Data
Aug. 10, 2017 (JP) .............. JP2017-155909
Sep. 27, 2017 (JP) .............. JP2017-186090

(51) Int. Cl.
*H04N 7/01* (2006.01)
*H04N 7/167* (2011.01)

(52) U.S. Cl.
CPC ........... *H04N 7/013* (2013.01); *H04N 7/0102* (2013.01); *H04N 7/1675* (2013.01)

(58) Field of Classification Search
CPC .. H04N 21/8355; H04N 7/1675; H04N 5/913; H04N 2005/91307;
(Continued)

(56) References Cited

U.S. PATENT DOCUMENTS 9,445,112 B2 * 9/2016 Culebro ................ H04N 19/40
2006/0071920 A1 4/2006 Ishimatsu et al.
(Continued)

FOREIGN PATENT DOCUMENTS

JP 2006-108961 A 4/2006
JP 2014-002581 A 1/2014

OTHER PUBLICATIONS

International Preliminary Report on Patentability dated Feb. 20, 2020, from International Application No. PCT/JP2018/029391, 11 sheets.
(Continued)

*Primary Examiner* — John W Miller
*Assistant Examiner* — Humam M Satti
(74) *Attorney, Agent, or Firm* — Katten Muchin Rosenman LLP (57) ABSTRACT

A video output controlling apparatus and a video output controlling method that can reduce the possibility that a video for which encryption is required may be outputted in a non-encrypted state are provided. A first acceptance unit (40) accepts a video and an encryption necessity signal indicative of whether or not encryption of the video is required via a first route. A second acceptance unit (44) accept a control signal via a second route different from the first route. A video conversion unit (46) converts, in accordance with the control signal, the video accepted by the first acceptance unit (40) into one of a video that is different in a format from that of the video and is in an encrypted state and a video that is different in a format from that of the video
(Continued)

and is not in an encrypted state. An output controlling unit (48) performs control regarding whether or not the video is to be outputted based on the encryption necessity signal and whether or not the video after conversion by the video conversion unit (46) is in an encrypted state.

7 Claims, 3 Drawing Sheets

(58) Field of Classification Search
CPC .......... H04N 2005/91314; H04N 2005/91321;
H04N 2005/91328; H04N 2005/91335;
H04N 2005/91342; H04N 2005/9135;
H04N 2005/91357; H04N 2005/91371;
H04N 2005/91378; H04N 7/013; H04N
7/0102; H04N 21/4408; G11B 20/00224
USPC .............................. 348/441, 467, 571, 426.1
See application file for complete search history.

(56) References Cited

U.S. PATENT DOCUMENTS

| 2006/0227967 | A1* | 10/2006 | Nishikawa | H04L 9/00 |
| | | | | 380/42 |
| 2011/0122142 | A1 | 5/2011 | Wyatt et al. | |
| 2016/0188909 | A1* | 6/2016 | Zatko | G06F 21/31 |
| | | | | 726/26 |

OTHER PUBLICATIONS

International Search Report and Written Opinion dated Oct. 30, 2018, from International Application No. PCT/JP2018/029391, 6 sheets.

Decision to Grant a Patent dated Oct. 20, 2020, from Japanese Patent Application No. 2019-535644, 3 sheets.

* cited by examiner

VIDEO OUTPUT CONTROLLING APPARATUS AND VIDEO OUTPUT CONTROLLING METHOD

TECHNICAL FIELD

The present invention relates to a video output controlling apparatus and a video output controlling method.

BACKGROUND ART

Standards for a communication interface such as DisplayPort or high-definition multimedia interface (HDMI) (registered trademark) are available.

Further, as an encryption technology of a content used in HDMI and so forth, high-bandwidth digital content protection (HDCP) is known.

SUMMARY

Technical Problem

Figure 1:
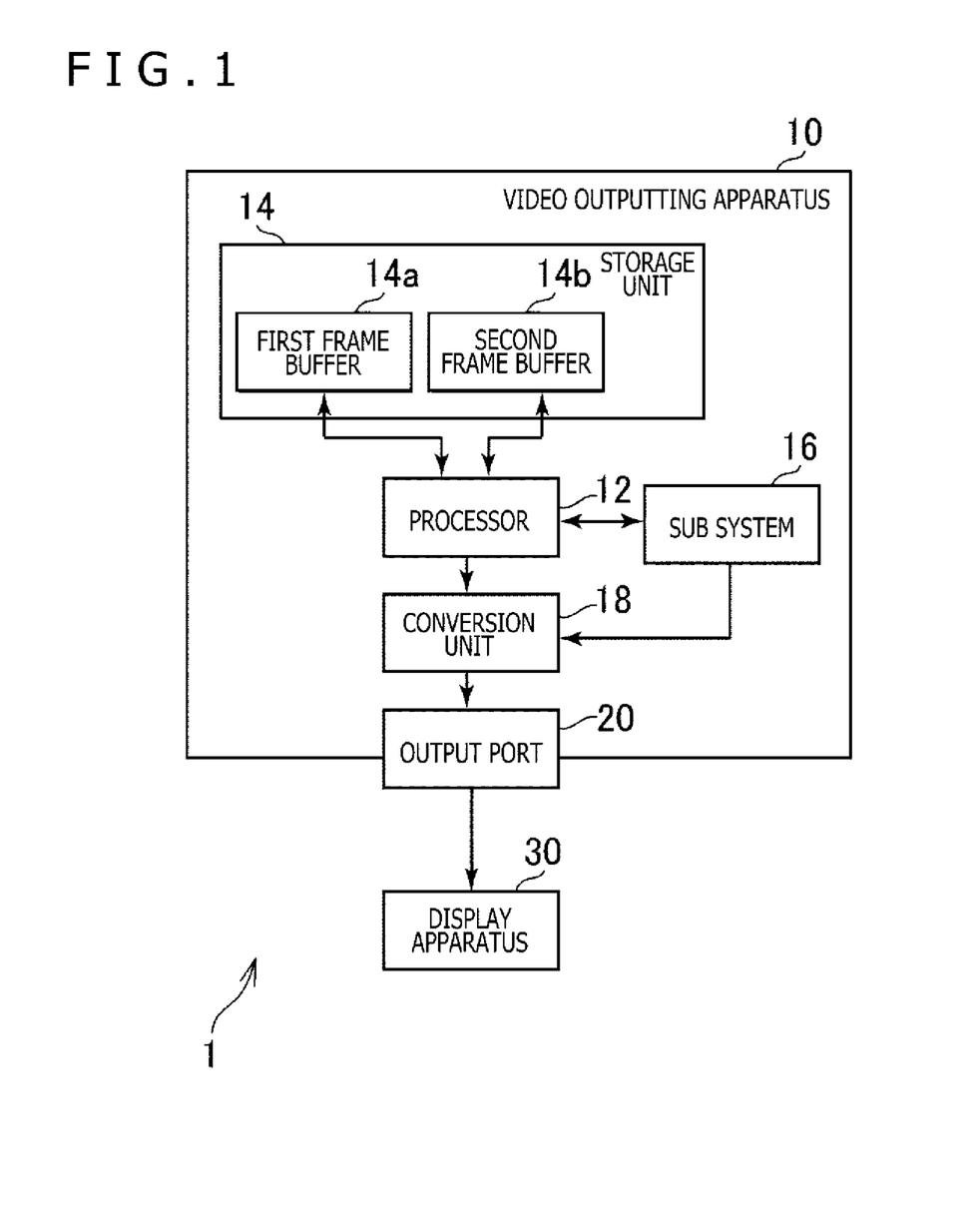
FIG. 1 is a view depicting an example of a general configuration of a video displaying system according to an embodiment of the present invention.

The inventors are considering such a video outputting apparatus 10 as depicted in FIG. 1. In the video outputting apparatus 10 depicted in FIG. 1, for example, a video of a first format outputted from a processor 12 is converted into a video of a second format by a conversion unit 18. In particular, for example, the conversion unit 18 converts a video of the format of DisplayPort into a video of the format of HDMI. Then, the video obtained by the conversion is outputted from an output port 20 to a display apparatus 30.

Here, a sub system 16 that operates in cooperation with the processor 12 outputs a control signal to the conversion unit 18. Then, the conversion unit 18 performs control regarding whether or not the video of the second format is to be encrypted in accordance with the control signal. In this manner, a video encrypted by HDCP or a video not encrypted is outputted to the display apparatus 30.

In the video outputting apparatus 10 depicted FIG. 1, if an appropriate control signal is inputted from the sub system 16 to the conversion unit 18, then a video for which encryption is required is outputted in an encrypted state. However, for example, if the video outputting apparatus 10 is modified such that an illegal control signal can be inputted to the conversion unit 18, then there is the possibility that a video for which encryption is required may be outputted in a non-encrypted state from the video outputting apparatus 10 to the display apparatus 30.

The present invention has been made in view of such an actual situation as described above, and one of objects of the present invention resides in provision of a video output controlling apparatus and a video output controlling method that can reduce the possibility that a video for which encryption is required may be outputted in a non-encrypted state.

Solution to Problem

In order to solve the subject described above, a video output controlling apparatus according to the present invention includes a first acceptance unit configured to accept a video and an encryption necessity signal indicative of whether or not encryption of the video is required via a first route, a second acceptance unit configured to accept a control signal via a second route different from the first route, a video conversion unit configured to convert, in accordance with the control signal, the video into one of a video that is different in a format from that of the video and is in an encrypted state and a video that is different in a format from that of the video and is not in an encrypted state, and an output controlling unit configured to perform control regarding whether or not the video is to be outputted based on the encryption necessity signal and whether or not the video after conversion by the video conversion unit is in an encrypted state.

In one aspect of the present invention, the first acceptance unit accepts the encryption necessity signal associated with a frame image included in the video, and the output controlling unit performs control regarding whether or not the frame image is to be outputted based on the encryption necessity signal and whether or not the frame image included in the video after the conversion by the video conversion unit and associated with the encryption necessity signal is in an encrypted state.

In the present aspect, when the first acceptance unit accepts a plurality of the encryption necessity signals associated with one frame image, in a case where one of the plurality of encryption necessity signals indicates that it is required that a frame image associated therewith is encrypted and the video after the conversion by the video conversion unit is not in an encrypted state, the output controlling unit may perform control such that the frame image is not outputted.

Further, in one aspect of the present invention, the first acceptance unit accepts the video and the encryption necessity signal indicative of whether or not encryption of the video is required from a processor, and the output controlling unit notifies, in a case where the first acceptance unit further accepts the encryption necessity signal indicating that encryption is required and besides the video conversion unit converts the video accepted by the first acceptance unit into a video that is different in a format from that of the video and is not in an encrypted state, the processer of the fact.

Meanwhile, a video output controlling method according to present inventions includes a step of accepting a video and an encryption necessity signal indicative of whether or not encryption of the video is required via a first route, a step of accepting a control signal via a second route different from the first route, a step of converting the video into one of a video that is different in a format from that of the video and is in an encrypted state and a video that is different in a format from that of the video and is not in an encrypted state, and a step of performing control regarding whether or not the video is to be outputted based on the encryption necessity signal and whether or not the video after conversion by the step of converting is in an encrypted state.

DESCRIPTION OF EMBODIMENT

In the following, an embodiment of the present invention is described with reference to the drawings.

FIG. 1 is a view depicting a generation configuration of a video displaying system 1 according to the embodiment of the present invention.

As depicted in FIG. 1, the video displaying system 1 according to the present embodiment includes a video outputting apparatus 10 and a display apparatus 30.

The video outputting apparatus 10 according to the present embodiment includes a processor 12, a storage unit 14, a sub system 16, a conversion unit 18, and an output port 20.

The processor 12 is, for example, a program control device such as a central processing unit (CPU) that operates in accordance with a program installed in the video outputting apparatus 10. The processor 12 according to the present embodiment includes also a graphics processing unit (GPU) that draws an image in a frame buffer on the basis of a graphics command and data supplied from the CPU. The processor 12 may otherwise be a secure processor.

The storage unit 14 includes storage elements such as, for example, a read-only memory (ROM) and a random access memory (RAM), a hard disk drive and so forth. In the storage unit 14, a program to be executed by the processor 12 and so forth are stored. Further, in the storage unit 14 according to the present embodiment, a region of a first frame buffer 14a and a region of a second frame buffer 14b in both of which an image is drawn by the GPU are secured.

The sub system 16 is a computer that cooperates, for example, with the processor 12 to control encryption of a video. The sub system 16 may be configured including a processor and a memory. Further, the sub system 16 may be configured including an electronic circuit.

The conversion unit 18 in the present embodiment is, for example, a computer that converts data of a video of a first format accepted from the processor 12 into data of a video of a second format. The conversion unit 18 converts data of a video of the format of, for example, DisplayPort into data of a video of the format of HDMI. The conversion unit 18 may be configured including a processor and a memory. Further, the conversion unit 18 may be configured including an electronic circuit.

The output port 20 is a port from which a video is outputted to the display apparatus 30 and is, for example, an HDMI port or the like.

The display apparatus 30 in the present embodiment is, for example, a display such as, for example, a liquid crystal display or an organic electroluminescence (EL) display and displays a video represented by data accepted from the output port 20.

The frame buffer according to the present embodiment is of the double buffer type and performs, when drawing of a frame buffer is being performed in the first frame buffer 14a, outputting of a frame image stored in the second frame buffer 14b. On the other hand, when drawing of a frame image is being performed in the second frame buffer 14b, outputting of frame image data stored in the first frame buffer 14a is performed. Then, for example, a flip process is executed at a predetermined timing such that a frame buffer to be used for writing of a frame image by the GPU and a frame buffer to be used for outputting of a stored frame image are switched.

Then, the processor 12 according to the present embodiment outputs, for example, a video of the DisplayPort format to the conversion unit 18. The conversion unit 18 converts the video accepted from the processor 12 into a video of the HDMI format. At this time, the conversion unit 18 converts the video into one of a video that has undergone encryption by HDCP and a video that has not undergone such encryption in accordance with a control signal accepted from the sub system 16.

Further, the processor 12 according to the present embodiment outputs also an encryption necessity signal that is a signal indicative of whether or not encryption of a video is required to the conversion unit 18.

Then, in the case where the conversion unit 18 accepts an encryption necessity signal indicating that encryption of a video is required and besides executes conversion into a video that has not undergone encryption, the conversion unit 18 suppresses outputting of the video. In this case, a video of a specific color (for example, a video of a black color) or a specific image may be outputted instead.

For example, modification of the video outputting apparatus 10 is sometimes performed such that an illegal control signal can be inputted to the conversion unit 18. In this case, there is the possibility that, although a video requires encryption, the video may be outputted in a non-encrypted state.

In the present embodiment, it is indicated by the encryption necessity signal that encryption of a video is required as described above, and in the case where a video for which encryption is required is not in an encrypted state, outputting of the video is suppressed. Here, for example, outputting itself of the video (outputting of the video signal) may be stopped compulsorily. As an alternative, for example, a substitute video (for example, a video of a black color, a video of white noise or the like) may be outputted. In this manner, according to the present embodiment, the possibility that a video for which encryption is required may be outputted in a non-encrypted state can be reduced. Further, according to the present embodiment, it can be sometimes prevented that a video for which encryption is required is outputted in a non-encrypted state.

Here, the encryption necessity signal may be incorporated as a packet equivalent to a vertical blanking signal or a horizontal blanking signal. In particular, for example, the encryption necessity signal may be incorporated as a DP Secondary Packet having a specific value set to the header thereof. In this case, for example, that encryption is required may be indicated by that the value of a specific field included in the payload of the DP Secondary Packet is 1. Further, for example, that encryption is not required may be indicated by that the value of the specific field included in the payload of the DP Secondary Packet is 0.

Figure 2:
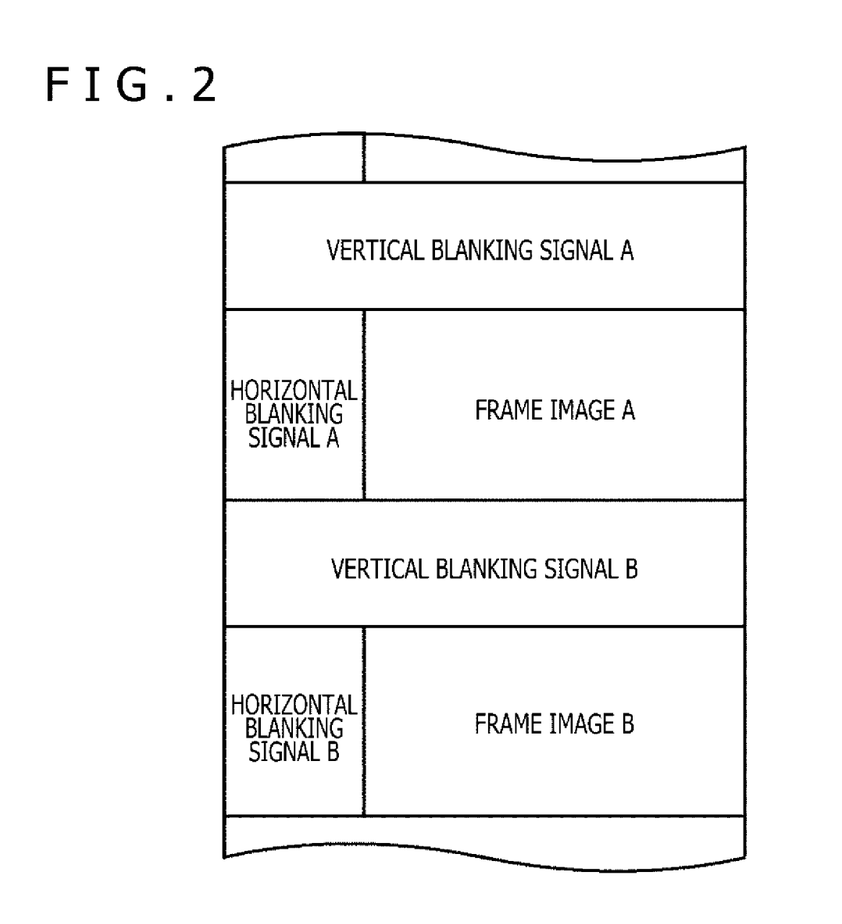
FIG. 2 is a view depicting an example of output timings of a vertical blanking signal, a horizontal blanking signal, and a frame image.

FIG. 2 depicts an example of output timings of a vertical blanking signal, a horizontal blanking signal, and a frame image. In FIG. 2, it is depicted that a vertical blanking signal is outputted after outputting of one frame image ends before outputting of a next frame image is started. In particular, it is depicted that a vertical blanking signal A is outputted before a frame image A is outputted. Further, it is depicted that a vertical blanking signal B is outputted after outputting of the frame image A ends before outputting of a frame image B is started.

Further, in FIG. 2, it is depicted that a horizontal blanking signal is outputted after outputting of one line included in one frame image ends before outputting of a next line is started. In particular, it is depicted that a horizontal blanking signal A is outputted after outputting of one line of the frame image A ends before outputting of a next line is started. Further, it is depicted that a horizontal blanking signal B is outputted after outputting of one line of the frame image B ends before outputting of a next line is started.

Further, in this case, for example, as one packet from among a plurality of packets equivalent to a vertical blanking signal, an encryption necessity signal indicative of whether or not encryption of a frame image to be outputted following the vertical blanking signal is required may be outputted. For example, as one packet from among a plurality of packets equivalent to the vertical blanking signal A, an encryption necessity signal indicative of whether or not encryption of the frame image A is required may be outputted. Similarly, as one packet from among a plurality of packets equivalent to the vertical blanking signal B, an encryption necessity signal indicative of whether or not encryption of the frame image B is required may be outputted.

Further, for example, as one packet from among a plurality of packets equivalent to a horizontal blanking signal, an encryption necessity signal indicative of whether or not encryption of a frame image next to a frame image outputted alternately with the horizontal blanking signal is required may be outputted. For example, as one packet from among a plurality of packets equivalent to the horizontal blanking signal A, an encryption necessity signal indicative of whether or not encryption of the frame image B is required may be outputted.

Further, the encryption necessity signal may be incorporated, for example, as the header of a frame image. For example, as the header of the frame image A, an encryption necessity signal indicative of whether or not encryption of the frame image A is required may be outputted. Further, for example, as the header of the frame image B, an encryption necessity signal indicative of whether or not encryption of the frame image B is required may be outputted.

Further, as the header of a frame image, an encryption necessity signal indicative of whether or not encryption of a frame image next to the frame image is required may be incorporated. For example, as the header of the frame image A, an encryption necessity signal indicative of whether or not encryption of the frame image B is required may be outputted.

As described above, for each of a plurality of frame images, an encryption necessity signal that indicates whether or not encryption of the frame image is required and is associated with the frame image may be outputted. Then, in the case where an encryption necessity signal indicating that encryption of a frame image is required is accepted and besides conversion into a frame image that is not in an encrypted state is executed, outputting of the frame image may be suppressed.

Further, there is the possibility that such modification that not only a regular encryption necessity signal but also an illegal encryption necessity signal are outputted to the conversion unit 18 may be performed. Therefore, for example, when a plurality of encryption necessity signals each associated with one frame image are outputted, it may be confirmed whether or not it is indicated that encryption is required for one of the encryption necessity signals. Then, in the case where it is confirmed that one of the encryption necessity signals indicates that encryption is required and the frame image after conversion is not in an encrypted state, outputting of the frame image may be suppressed.

For example, to the conversion unit 18, not only a regular encryption necessity signal indicating that encryption is required but also an encryption necessity signal indicating that encryption is not required are illegally inputted as a vertical blanking signal immediately before a frame image is outputted. Also in this case, if the foregoing is applied, then in the case where a frame image for which encryption is required is not in an encrypted state, outputting of the frame image is suppressed on the basis of the regular encryption necessity signal associated with the frame image. In this manner, if the foregoing is applied, then the possibility that a frame image for which encryption is required may be outputted in a non-encrypted state can be reduced. Further, if the foregoing is applied, then also it can sometimes be prevented that a frame image for which encryption is required is outputted in a non-encrypted state.

Further, the processor 12 may output a frame image or a blanking signal to the conversion unit 18 after it scrambles the same. In this case, the conversion unit 18 first descrambles a frame image or a blanking signal accepted from the processor 12 and then executes succeeding processes.

In the following, functions of the conversion unit 18 according to the present embodiment and processes executed by the conversion unit 18 according to the present embodiment are further described.

Figure 3:
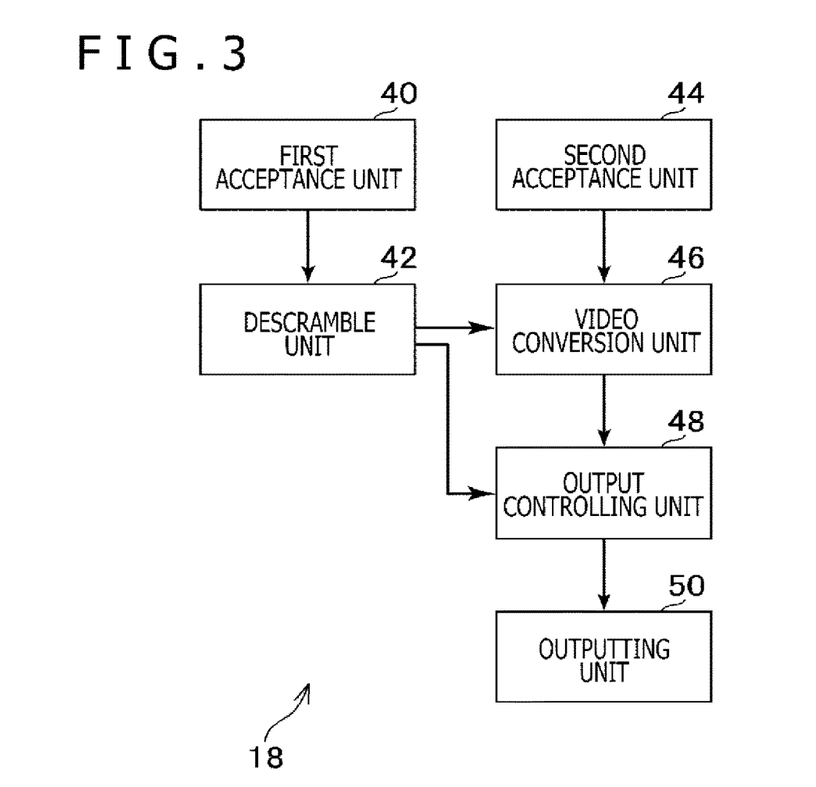
FIG. 3 is a functional block diagram depicting an example of functions incorporated in a conversion unit according to the embodiment of the present invention.

FIG. 3 is a functional block diagram depicting an example of functions incorporated in the conversion unit 18 according to the present embodiment. It is to be noted that the conversion unit 18 according to the present embodiment needs not have incorporated therein all functions depicted in FIG. 3 and may have incorporated therein functions other than the functions depicted in FIG. 3.

As depicted in FIG. 3, the conversion unit 18 according to the present embodiment includes a first acceptance unit 40, a descramble unit 42, a second acceptance unit 44, a video conversion unit 46, an output controlling unit 48, and an outputting unit 50.

The functions mentioned may be incorporated by executing a program including instructions installed in the video outputting apparatus 10 that is a computer and corresponding to the functions by the processor 12 or by a processor provided in the conversion unit 18. This program may be supplied to the video outputting apparatus 10 through a computer-readable information storage medium such as, for example, an optical disk, a magnetic disk, a magnetic tape, a magneto-optical disk, or a flash memory or through the Internet or the like.

The first acceptance unit 40 in the present embodiment accepts an encryption necessity signal indicative of a video and whether or not encryption of the video is required, for example, via a first route. For example, the first acceptance unit 40 accepts a video and an encryption necessity signal of the DisplayPort format from the processor 12.

The descramble unit 42 in the present embodiment descrambles, for example, a signal accepted by the first acceptance unit 40.

The second acceptance unit 44 in the present embodiment accepts a control signal, for example, via a second route different from the first route. For example, the second acceptance unit 44 accepts a control signal from the sub system 16.

The video conversion unit 46 in the present embodiment converts a video accepted by the first acceptance unit 40 into one of a video that is different in the format from that of the video and is in an encrypted state and a video that is different in the format from that of the video and is not in a non-encrypted state, for example, in accordance with a control signal accepted by the second acceptance unit 44. The video conversion unit 46 may convert a video of the DisplayPort format into a video of the HDMI format.

The output controlling unit 48 in the present embodiment performs, on the basis of an encryption necessity signal accepted by the first acceptance unit 40 and whether or not a video after conversion by the video conversion unit 46 is in an encrypted state, control regarding whether or not the video is to be outputted. Here, for example, the output controlling unit 48 may hold a packet equivalent to the encryption necessity signal accepted by the first acceptance unit 40. Then, the output controlling unit 48 may perform, on the basis of the packet held therein and whether or not the video after conversion by the video conversion unit 46 is in an encrypted from, control regarding whether or not the video is to be outputted.

The outputting unit 50 in the present embodiment outputs, for example, a video controlled so as to be outputted to the display apparatus 30 via the output port 20. Here, in the case where the video is controlled so as not to be outputted by the output controlling unit 48, the outputting unit 50 may compulsorily stop outputting itself of the video (outputting of the video signal). Further, in the case where the video is controlled so as not to be outputted by the output controlling unit 48, the outputting unit 50 may output a substitute video (for example, a video of a black color, a video of white noise or the like).

Here, the first acceptance unit 40 may accept an encryption necessity signal associated with a frame image included in the video as described hereinabove. In this case, the output controlling unit 48 may perform, on the basis of the encryption necessity signal and whether or not a frame image included in the video after conversion by the video conversion unit 46 and associated with the encryption necessity signal is in an encrypted state, control regarding whether or not the frame image is to be outputted.

Further, the first acceptance unit 40 may accept a plurality of encryption necessity signals associated with one frame image as described hereinabove. Here, in the case where one of the plurality of encryption necessity signals indicates that it is required that the associated frame image is encrypted and the video after conversion by the video conversion unit 46 is not in an encrypted state, the output controlling unit 48 may control the frame so as not to be outputted.

The series of processes of acceptance of a video by the first acceptance unit 40, descramble by the descramble unit 42, conversion of the video by the video conversion unit 46, output control of the video by the output controlling unit 48, and outputting of the video by the outputting unit 50 may be executed in a unit of a pixel included in a frame image. As an alternative, the series of processes described above may be executed in a unit of several pixels. As another alternative, the series of processes described above may be executed in a unit of a frame image.

Figure 4:
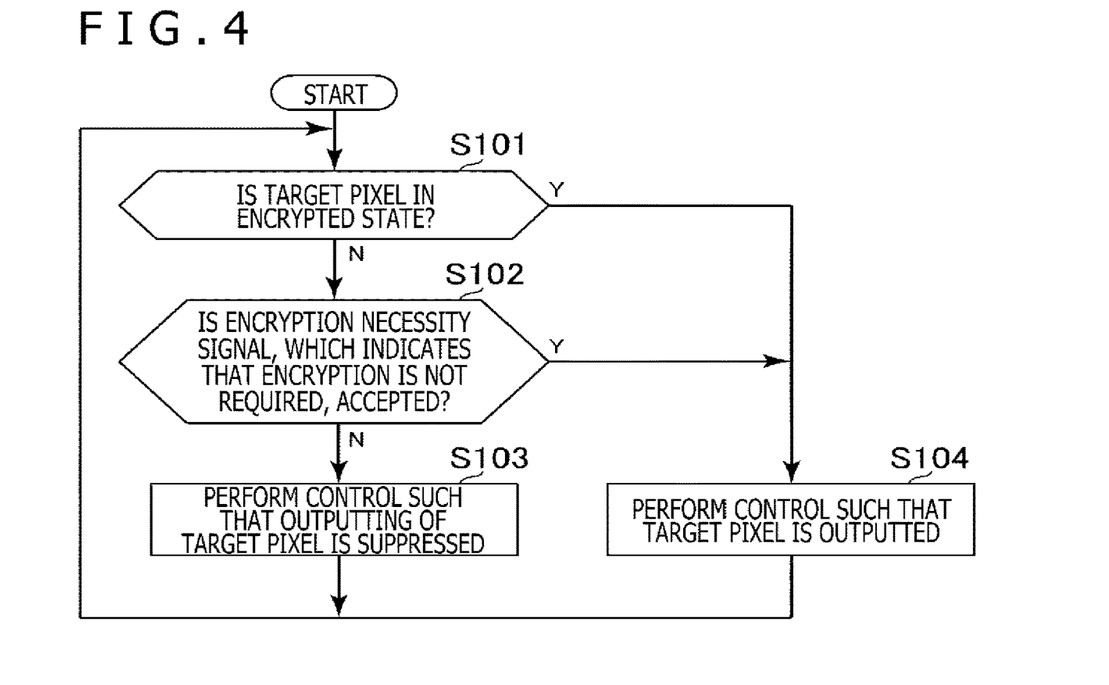
FIG. 4 is a flow chart depicting an example of a flow of processing performed by the conversion unit according to the embodiment of the present invention.

In the following, an example of a flow of processing executed by the output controlling unit 48 according to the present embodiment for performing control regarding whether or not a video is to be outputted is described with reference to a flow chart exemplified in FIG. 4.

In the present processing example, the following processes are executed, for example, in a unit of a pixel included in a frame image converted by the video conversion unit 46.

Further, in the present processing example, it is assumed that the output controlling unit 48 holds a packet of an encryption necessity signal included in a vertical blanking signal immediately before the first acceptance unit 40 accepts a frame image including the pixel.

Here, as a vertical blanking signal immediately before a frame image including the pixel is accepted, a plurality of packets of different encryption necessity signals are sometimes accepted. In this case, in the case where one of the encryption necessity signals indicates that encryption is required, the output controlling unit 48 holds the packet of the encryption necessity signal that indicates that encryption is required. Further, in the case where all encryption necessity signals indicate that encryption is not required, the output controlling unit 48 holds a packet of an encryption necessity signal that indicates that encryption is not required.

First, the output controlling unit 48 confirms whether or not the pixel after conversion by the video conversion unit 46 is in an encrypted state (S101). In the following description, the pixel is referred to as target pixel.

In the case where it is confirmed that the pixel is not in an encrypted state (S101: N), the output controlling unit 48 confirms whether or not the first acceptance unit 40 accepts an encryption necessity signal indicating that encryption is not required and associated with the frame image including the target pixel (S102). Here, the output controlling unit 48 may execute the confirmation on the basis of the packets held therein.

It is assumed here that it is confirmed that an encryption necessity signal that indicates that encryption is not required and is associated with the frame image described above is not accepted (S102: N). For example, a case in which an encryption necessity signal indicating that encryption is required and associated with the frame image described above is accepted as an immediately preceding vertical blanking signal is included in this case. Also a case in which an encryption necessity signal associated with the frame image described above is not accepted as an immediately preceding vertical blanking signal is included in this case. In this case, the output controlling unit 48 performs control such that outputting of the target pixel is suppressed (S103). In this manner, in the case where an encryption necessity signal is not accepted, similar operation to that in the case where an encryption necessity signal indicating the encryption is required may be performed. This makes it possible to reduce the possibility that, also in the case where the outputting function of the processor 12 for outputting an encryption necessity signal does not operate correctly, a video for which encryption is required may be outputted in a non-encrypted state to the display apparatus 30. Further, in this case, outputting itself of the target pixel (outputting of a signal representative of the target pixel) may be stopped compulsorily as described hereinabove. Alternatively, a substitute video (for example, a video of a black color, a video of white noise or the like) may be outputted. Then, the processing returns to S101, and the processes at the steps beginning with S101 are executed for a subsequently converted pixel.

In the case where it is confirmed by the process indicated at S101 that the target pixel is in an encrypted state (S101: Y), the output controlling unit 48 performs control such that the target pixel is outputted (S104). Also in the case where it is confirmed by the process indicated at S102 that an encryption necessity signal indicating that encryption is not required and associated with the frame image described above, the output controlling unit 48 performs control such that the target pixel is outputted (S104). Then, the processing returns to the process indicated by S101, and the processes beginning with S101 are executed for a pixel converted next.

It is to be noted that, although, in the processing example described above, the processes at S101 to S104 are executed in a unit of a pixel, the processes at S101 to S104 may be executed otherwise in a unit of several pixels or in a unit of a frame image.

Further, for example, in the case where it is confirmed that the target pixel is in an encrypted state, the output controlling unit 48 may confirm whether or not the first acceptance unit 40 accepts an encryption necessity signal indicating that encryption is required and associated with the frame image including the target pixel. Then, in the case where it is confirmed that an encryption necessity signal indicating that encryption is required and associated with the frame image described above is not accepted, the output controlling unit 48 may perform control such that outputting of the target pixel is suppressed.

Further, for example, in the case where the first acceptance unit 40 does not accept an encryption necessity signal, even if the second acceptance unit 44 accepts a control signal instructive of encryption, the output controlling unit 48 may perform control such that a video is not outputted.

It is to be noted that the present invention is not limited to the embodiment described above.

For example, it is assumed that the first acceptance unit 40 accepts an encryption necessity signal indicating that encryption is required and besides the video conversion unit 46 converts the video accepted by the first acceptance unit 40 into a video that is of a format different from that of the video and is not in an encrypted state. In this case, the output controlling unit 48 may notify the processor 12 of this.

Further, for example, it is assumed that the first acceptance unit 40 does not accept an encryption necessity signal and besides the video conversion unit 46 converts a video accepted by the first acceptance unit 40 into a video that is of a format different from that of the video and is not in an encrypted state. In this case, the output controlling unit 48 may notify the processor 12 of this.

For example, in the case where the process indicated at S103 described above is executed, the output controlling unit 48 may execute the notification described above to the processor 12 together.

For example, this makes it possible to prompt the processor 12 to execute a process that becomes countermeasures against inappropriate control such as stopping of operation, re-activation, or notification of occurrence of inappropriate control of the video outputting apparatus 10.

Further, the scene to which the present invention can be applied is not restricted. For example, the present invention can be applied to a scene in which a video generated by the processor 12 and representative of a play situation of a game is converted by the conversion unit 18 and outputted from the video outputting apparatus 10 to the display apparatus 30. Further, the present invention can be applied to a scene in which a video of a content such as a movie stored in the storage unit 14 is converted by the conversion unit 18 and outputted from the video outputting apparatus 10 to the display apparatus 30.

Further, the particular character sequences and numerical values given hereinabove and the particular character sequences and numerical values in the drawings are exemplary, and such character sequences and numerical values are not restrictive.

The invention claimed is:

1. A video output controlling apparatus, comprising:
a main processor;
a sub-processor different from the main processor;
a first acceptance unit configured to accept a video and an encryption necessity signal indicative of whether or not encryption of the video is required via a first route;
a second acceptance unit configured to accept a control signal via a second route different from the first route;
a video conversion unit configured to convert, in accordance with the control signal, the video into one of a video that is different in a format from that of the video and is in an encrypted state and a video that is different in a format from that of the video and is not in an encrypted state,
wherein the first route is a direct route without any interruption from the main processor to video conversion unit, and
wherein the second route is a different direct route without any interruption from the sub-processor and the video conversion unit; and
an output controlling unit configured to perform control regarding whether or not the video is to be outputted based on the encryption necessity signal and whether or not the video after conversion by the video conversion unit is in an encrypted state.

2. The video output controlling apparatus according to claim 1, wherein
the first acceptance unit accepts the encryption necessity signal associated with a frame image included in the video; and
the output controlling unit performs control regarding whether or not the frame image is to be outputted based on the encryption necessity signal and whether or not the frame image included in the video after the conversion by the video conversion unit and associated with the encryption necessity signal is in an encrypted state.

3. The video output controlling apparatus according to claim 2, wherein,
when the first acceptance unit accepts a plurality of the encryption necessity signals associated with one frame image, in a case where one of the plurality of encryption necessity signals indicates that it is required that a frame image associated therewith is encrypted and the video after the conversion by the video conversion unit is not in an encrypted state, the output controlling unit performs control such that the frame image is not outputted.

4. A video output controlling method, comprising:
accepting a video and an encryption necessity signal indicative of whether or not encryption of the video is required via a first direct route without any interruption from a main processor to a conversion unit of a video outputting apparatus;
accepting a control signal via a second direct route different from the first route,
wherein the second direct route is a direct route from a sub-processor to the conversion unit without any intermediaries or interruptions;
converting the video into one of a video that is different in a format from that of the video and is in an encrypted state and a video that is different in a format from that of the video and is not in an encrypted state; and
performing control regarding whether or not the video is to be outputted based on the encryption necessity signal and whether or not the video after conversion by the converting is in an encrypted state,
wherein the video is output not in an encrypted state only if both the encryption necessity signal and the control signal concurrently specify no encryption of the video is required.

5. The video output controlling apparatus according to claim 1, wherein the video is output not in the encrypted state only if the encryption necessity signal and the control signal both specify no encryption is required.

6. The video output controlling apparatus according to claim 5, wherein the video is output in the encrypted state if either the encryption necessity signal or the control signal specify encryption is required.

7. The video output controlling apparatus according to claim 1, wherein no video is output by the output controlling unit if the encryption necessity signal and the control signal differ in an encryption necessity requirement.

\* \* \* \* \*